United States Patent

Shaw et al.

[11] Patent Number: 5,318,254
[45] Date of Patent: Jun. 7, 1994

[54] AIRCRAFT MAINTENANCE ROBOT

[75] Inventors: E. Craig Shaw; Marlee Payne-Shaw, both of Carrollton, Tex.

[73] Assignee: Conceptual Solutions, Inc., Waxahachie, Tex.

[21] Appl. No.: 722,968

[22] Filed: Jun. 28, 1991

[51] Int. Cl.⁵ .......................... B64D 15/00
[52] U.S. Cl. .................. 244/134 C; 244/134 R; 901/1; 901/43; 239/281; 239/135
[58] Field of Search .......... 244/134 R, 134 C; 901/1, 43; 239/280, 281, 135, 139

[56] References Cited

U.S. PATENT DOCUMENTS

| | | | |
|---|---|---|---|
| 4,378,959 | 4/1983 | Susnjara | 901/43 X |
| 4,723,733 | 2/1988 | McClinchy | 244/134 C |
| 4,732,351 | 3/1988 | Bird | 244/134 R X |
| 4,815,840 | 3/1989 | Benayad-Cherif et al. | 901/1 X |
| 4,869,935 | 9/1989 | Hayashi et al. | 901/43 X |
| 5,104,068 | 4/1992 | Krilla et al. | 244/134 R |

Primary Examiner—Joseph F. Peters, Jr.
Assistant Examiner—Christopher P. Ellis
Attorney, Agent, or Firm—Baker & Botts

[57] ABSTRACT

An aircraft maintenance robot (20) for maintaining aircraft surfaces is described that includes a maintenance tool (228), for example a nozzle (78), conduits and a pump, which supply fluid to the maintenance tool, which sprays the fluid on aircraft surfaces; movable arm with rotatable hinges and wrists such that a manifold to which the maintenance tools are coupled may be positioned in response to control signals; and a processor which, after accounting for the position of the aircraft, the weather conditions, and the physical dimensions of the aircraft, generates the control signals used to position the maintenance tool such that, after positioning the aircraft, the maintenance operation may be performed without human intervention. The preferred embodiment of the present invention discloses the use of the maintenance robot (20) for deicing aircraft. A wide variety of interchangeable end effectors, however, may be used for a wide variety of applications. These may include various cleaning, painting, paint removing, and even firefighting applications.

13 Claims, 6 Drawing Sheets

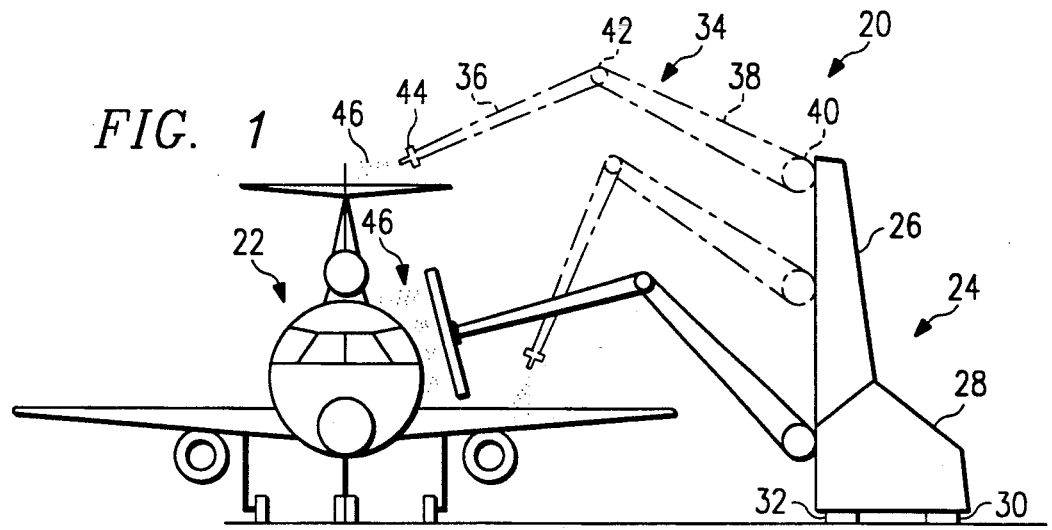
FIG. 1
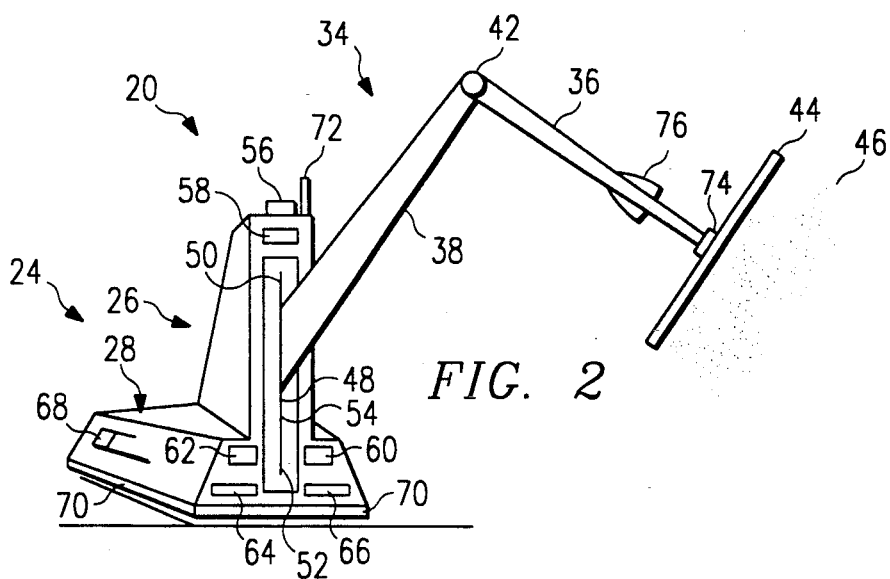
FIG. 2
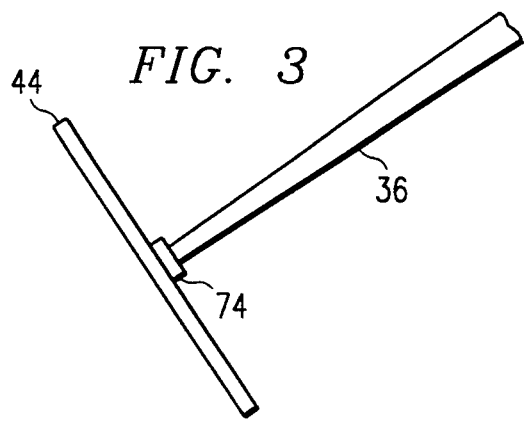
FIG. 3
FIG. 4
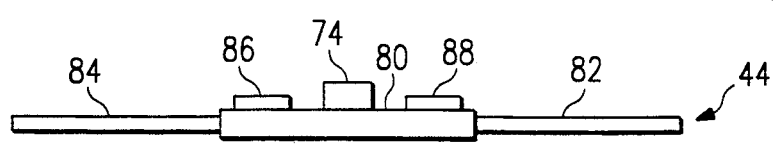

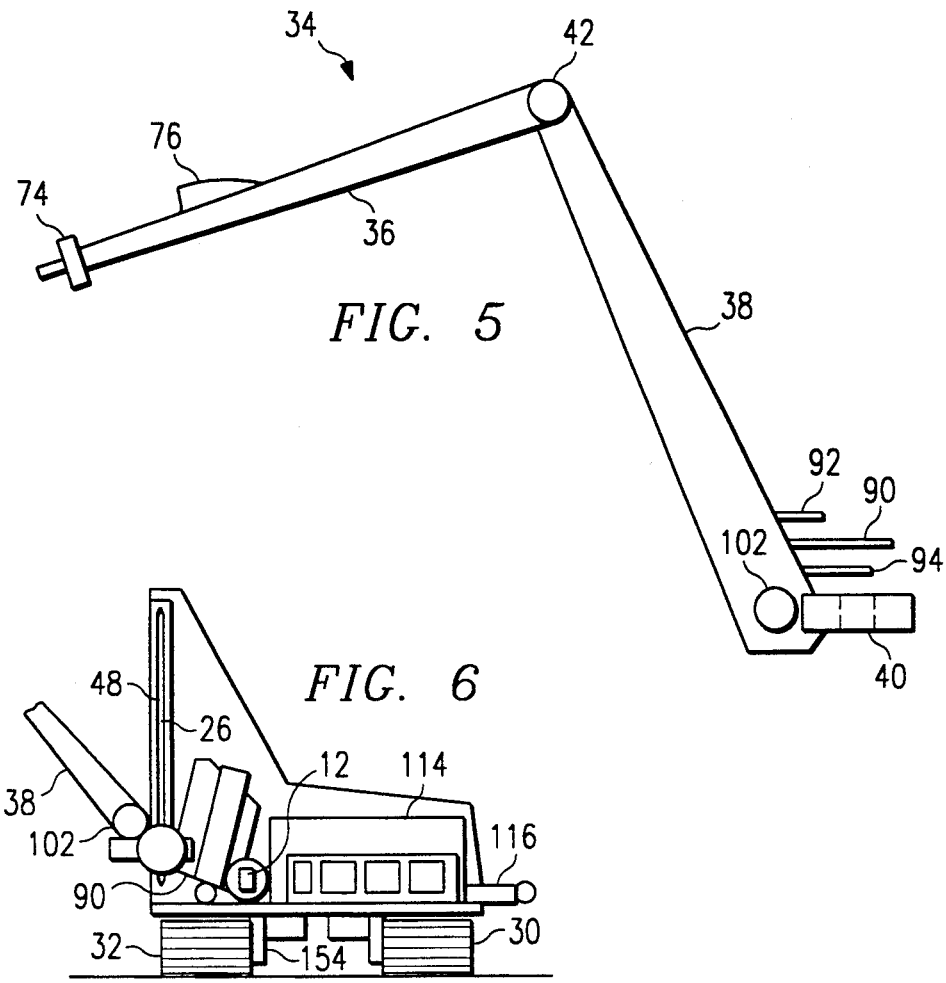
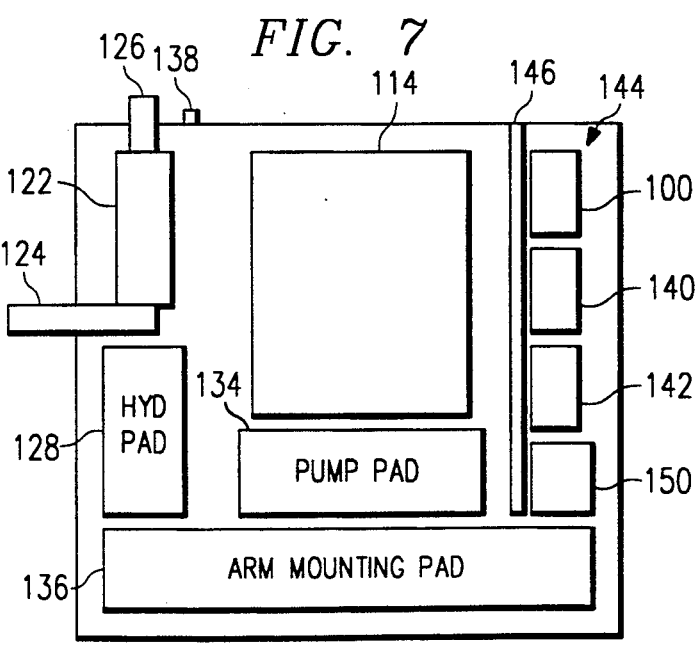

AIRCRAFT MAINTENANCE ROBOT

TECHNICAL FIELD OF THE INVENTION

This invention relates in general to aviation and more particularly to an apparatus and method for automatically deicing and maintaining an aircraft.

BACKGROUND OF THE INVENTION

The presence of ice on aircraft surfaces can destroy or substantially reduce lift, which is necessary for flight. Therefore, when icing conditions exist, the ice must be removed or prevented, generally referred to as "deiced," before take off. Aircraft are typically deiced by the application of a heated deicing fluid, which is usually glycol.

One present method of deicing aircraft entails using a truck or similar vehicle with an arm attached. The arm has a cradle at the end from which an operator positions the arm and sprays deicing fluid on the surfaces of the aircraft. This method has several inherent disadvantages. First, this method requires considerable time to deice the aircraft. Additionally, waste of deicing fluid frequently results from the application of excessive amounts of deicing fluid. Moreover, human error in positioning and applying the deicing fluid is more probable, especially since the greatest need for deicing typically occurs in the harshest weather conditions. The human error and excessive amounts of deicing fluid expose operators to direct contact with the potentially dangerous chemicals in the deicing fluid.

Another method of deicing aircraft involves using a truck or similar vehicle with a arm attached thereto, and the arm positioned by remote. An operator views a monitor coupled to the arm, and based on the view from the remote camera, the operator positions the nozzles and sprays the surfaces. This method suffers from the same deficiencies as the prior system, but even less effectively deices the aircraft because the operator only views the aircraft surface through the remote video camera. If it is not possible to see in through the video camera, the operator will erroneously determine that the surface is free of ice.

A system is therefore needed to automatically deliver heated deicing fluid to the surfaces of aircraft in a short time, without waste of deicing fluid, and without error caused by human operators.

SUMMARY OF THE INVENTION

The present invention provides an automatic robotic deicing apparatus and method designed to satisfy the aforementioned needs. The deicing is carried out by an automatic, robotic deicing robot having a manipulable arm with nozzles for spraying deicing fluid. The present invention may also be used to perform other basic maintenance tasks on aircraft surfaces.

According to one embodiment of the present invention, deicing fluid is delivered to nozzles which are attached to a free end of an arm comprised of a plurality of arms responsive to control signals generated by a microprocessor. The microprocessor generates the control signals after accounting for the position of the aircraft, the dimensions of the aircraft, and the weather conditions. Deicing fluid may then be delivered to the surfaces of the aircraft without substantial intervention of a human operator.

According to another embodiment of the present invention, a recovering and reconditioning system is provided such that a portion of the deicing fluid sprayed on the surfaces of the aircraft may be recovered and reconditioned for re-use.

According to another embodiment of the present invention, a maintenance tool is coupled to a free end of an arm comprised of a plurality of arms that are responsive to control signals generated by a microprocessor. This arrangement allows the maintenance tool to follow the surfaces of the aircraft in close proximity such that the aircraft may be washed, inspected by video, depainted or deiced depending on the particular maintenance tool coupled to the free end of the plurality of arms, without substantial intervention of a human operator.

According to another aspect of the present invention, there is provided a method for deicing aircraft comprising the steps of preparing the deicing fluid for application; generating control signals that account for the size of the aircraft, the position of the aircraft in the deicing area, and the weather conditions. Then, the robot positions the nozzles to deliver the deicing fluid in response to the control signals such that the deicing fluid may be delivered to the surfaces without substantial intervention of a human operator.

The method and apparatus for automatically deicing aircraft provide several technical advantages. The method and apparatus eliminate the need for substantial human intervention by an operator and, consequently, the inherent disadvantages of a human operator, including excess deicing time, operation inefficiency, and human error. The automated delivery of deicing fluid to aircraft surfaces means that consistent deicing would occur despite harsh weather conditions. Additionally, the use of an automated, robotic arm allows placement of the nozzles in close proximity to the aircraft surfaces, which further reduces the waste of deicing fluid and maintains the heated temperature of the deicing fluid. Additionally, the automated, robotic deicer allows faster application of deicing fluid to the surfaces of an aircraft.

BRIEF DESCRIPTION OF THE DRAWINGS

A more complete understanding of the present invention may be acquired by referring to the detailed description and claims when considered in connection with the accompanied drawings in which like reference numbers indicate like features and wherein:

FIG. 1 is a perspective view of the aircraft maintenance robot of the preferred embodiment applying deicing fluid to a typical commercial aircraft;

FIG. 2 is a schematic, elevational view of the maintenance robot;

FIG. 3 is a schematic side view of the manifold;

FIG. 4 is a schematic top view of the manifold;

FIG. 5 is a side view of the arm;

FIG. 6 is a schematic, cutaway, side view of the maintenance robot chassis;

FIG. 7 is a schematic, cutaway, top view of the aircraft maintenance robot chassis base;

DETAILED DESCRIPTION OF THE INVENTION

Figure 8:
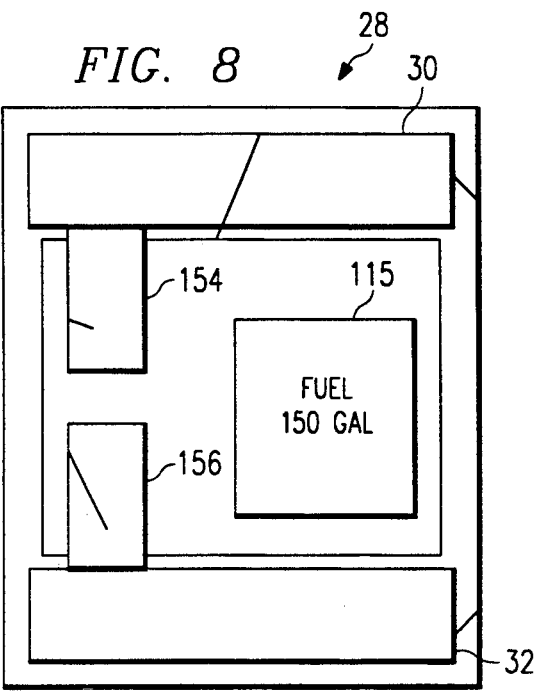
FIG. 8 is a schematic, cutaway, bottom view of the aircraft maintenance robot chassis base.

The preferred embodiment of the present invention is best understood by referring to FIGS. 1–16 of the drawings, like numerals being used for like and corresponding parts of the various drawings.

FIG. 1 provides an illustrative drawing showing the aircraft maintenance robot 20 of the preferred embodiment applying a deicing fluid to a typical commercial aircraft 22 on an airport runway. The deicing fluid may be heated or at ambient temperature depending on the particular chemical compound being used. According to FIG. 1, aircraft maintenance robot 20 comprises chassis 24, which includes mast 26 and chassis base 28. From chassis base 28, tracks 30 and 32 provide both support and a way to move the aircraft maintenance robot 20. On mast 26 is arm 34, comprising arms 36 and 38, which attaches to arm support trunnion 40. Extending from mast 26, inner arm 38 attaches to trunnion 40 and to elbow 42. Additionally, outer arm 36 attaches to elbow 42 and, at the opposite end, includes manifold, or end effector, 44. Manifold 44 comprises a plurality of nozzles 78 (not shown) through which deicing fluid 46 may flow to commercial aircraft 22. As FIG. 1 illustrates, arm 34 may take a variety of positions along mast 26, and arm 34 may take a great number of positions to fully apply deicing fluid 46 to commercial aircraft 22.

Referring to FIG. 2, aircraft maintenance robot 20 includes chassis base 28, to which mast 26 is attached. Movable robotic arm 34 is attached to trunnion support 40 (not shown). Support trunnion 40 slides within guide 48 in mast 26 from the uppermost position 50 to the lowermost position 52, and to maintain isolation between the outside atmosphere and the internal mechanics of mast 26, seal 54 extends the length of guide 48 and may comprise a rubber material or brush configuration. Aircraft maintenance robot 20 also includes indication lights 56 and 58. Indication light 56 may comprise a rotating light, similar to that often found on moving objects on the airfield, to indicate movement of aircraft maintenance robot 20. Indication light 58 may be red or some other color to indicate operation or movement of a robotic arm 34. At the lower portion of the aircraft maintenance robot 20 and located on chassis base 28 are indication lights 60, 62, 64 and 66, which indicate operation of the unit. Along the side of the lower chassis base 28 appears inlet 68 for providing air to an internal gas turbine engine 122. Although the preferred embodiment uses a gas turbine engine 122 for prime movement, other similarly compatible forms of locomotion are considered within the scope of the present invention. Near the bottom edge of chassis base 28 are bumper guards 70 to prevent damage to aircraft maintenance robot 20 or other structures or equipment in the event of inadvertent contact between them and aircraft maintenance robot 20. Located near the top of mast 26 appears antenna 72 for transmitting data to and from aircraft maintenance robot 20.

Inner arm 38 is attached to trunnion 40 at one end and elbow 42 at the other, to which outer arm 36 is also attached. The end of outer arm 36, opposite to elbow 42, is manifold 44 and wrist 74. Near wrist 74 on outer arm 36 appears camera 76. Camera 76 may be an infrared camera, thermographic scanner, ultrasonic sensor, video camera, or any appropriate sensor or viewing device for various viewing and sensing applications.

Referring now to FIG. 3, there is shown a side view of manifold 44. Outer arm 36 of arm 34 is coupled to manifold 44 at wrist 74. Nozzles 78 (not shown) are coupled to manifold 44 in such a way as to allow spraying of fluids away from manifold 44. In addition to nozzles 78, proximity sensors 79 are coupled to the manifold 44. The proximity sensors 79 are a safety feature which automatically will disable the arm 34 if the manifold 44 is too close to an aircraft surface.

Referring now to FIG. 4, there is shown a top view of manifold 44. Wrist 74 couples outer arm 36 (not shown) and manifold midsection 80. Manifold extensions 82 and 84 are slidably connected to manifold midsection 80 such that the size of manifold 44 may be varied. Manifold extension actuators 86 and 88 are operable to slide in and slide out of manifold extensions 82 and 84 into or out of midsection 80, allowing for a variation of the size of manifold 44. The unexpanded size of the manifold 44 may be used to deice small aircraft.

Referring now to FIG. 5, a side view of the arm 34 is shown. Wrist 74 is located on the end of outer arm 36, which is also coupled to inner arm 38 at elbow 42. Inner arm 38 is also coupled to support trunnion 40. Near the connection of support trunnion 40 to inner arm 38 appears a portion of deicing fluid conduit 90, which enters inner arm 38 near trunnion 40 and runs the length of arm 34 through wrist 74 into nozzles 78 located on manifold 44. Also entering inner arm 38 near trunnion 40 is camera linkage 92, which couples the camera 76, located on outer arm 36, with monitor 96 (not shown) and VCR 98 (not shown). Camera link 92 may be, for example, electrical linkage or fiber optics. Entering inner arm 38 near trunnion 40 is also control signal lines 94, which couple actuators in the arm and manifold to a first processor 100 (not shown). Trunnion 40 is coupled to inner arm 38 at rotatable hinge 102. Rotatable hinge 102 has an actuator 104 (not shown), which can rotatably move inner arm 38 about rotatable hinge 102 in response to control signals 192, developed by first processor 100 and carried by control signal lines 94 to actuator 104. Similarly, actuator 108 (not shown) located at rotatable hinge 42 allows outer arm 36 to be rotatably moved about rotatable hinge 42 in response to control signals 192. Wrist 74 contains actuator 110, which can move the wrist in two axes in response to control signals 192 developed by the first processor 100.

Now referring to FIG. 6, there is schematically shown a cutaway side view of the chassis 24 of the aircraft maintenance robot 20. Inner arm 38 is associated with rotatable hinge 102, which may be raised and lowered in guide 48 on mast 26. Deicing fluid conduit 90 enters inner arm 38 near rotatable hinge 102. Deicing fluid conduit 90 allows the transport of deicing fluid 46 from pump 112 to nozzles 78. Adequate deicing fluid conduit 90 is provided such that slidable hinge 102 may slide full travel in guide 48 from the uppermost position 50 (not shown) to the lowermost position 52 (not shown). Pump 112 is associated with deicing fluid reservoir 114, which is in fluid communication with pump 112. Deicing fluid reservoir 114 may be filled with deicing fluid 46 through filling port 116. Filling port 116 may be connected to a truck of deicing fluid (not shown) or may be connected to a fluid farm 118 (not shown).

Now referring to FIG. 7, there is shown a cutaway top view of chassis base 28 of the aircraft maintenance robot 20. Near the middle of chassis base 28 is deicing fluid reservoir 114. Deicing fluid reservoir 114 in the preferred embodiment has heating elements 120 (not shown) and may contain approximately 8000 gallons of deicing fluid in the preferred embodiment. The heating elements 120 allow the deicing fluid 46 to be maintained at high temperatures, as high as 210° F. Located to one side of deicing fluid reservoir 114 is turbine generator 122. The air needed for turbine generator 122 is provided through air intake 124 and exhaust exits through exit port 126. The turbine generator 122 is capable of providing all necessary energy for operation of the aircraft maintenance robot 20, but external power may be accepted, as well. Located to one side of air intake 124 is hydraulic pad 128, on which may rest hydraulic reservoir 130 (not shown) and hydraulic pump 132 (not shown). Adjacent to hydraulic pad 128 and deicing fluid reservoir 114 is pump pad 134, on which rests pump 112. Located near pump pad 134 is arm mounting pad 136, upon which arm 34 and part of mast 26 are mounted. Opposite arm mounting pad 136 and near exhaust port 126 appears power source connection 138, which allows for external power to be used by the aircraft maintenance robot 20. The aircraft maintenance robot 20 may operate with external power provided through power source connection 138 or on power internally produced by turbine generator 122.

Located to one side of the chassis base 28 is processor compartment 144, which is separated from the rest of the base 28 by insulating divider 146. In the corner of the processor compartment 144 is the first processor 100, which is the main processor for controlling maintenance operations performed by the aircraft maintenance robot 20. Adjacent to the first processor 100 is the backup first processor 140. Backup processor 140 will assume responsibility for controlling operations of the aircraft maintenance robot 20 in the event of a failure of the first processor 100. A second processor 142 is located on the other side of backup first processor 140. The second processor 142 may be connected to weather transducers 148 (not shown), from which it may develop weather information. The second processor 142 then may communicate to first processor 100 the weather information. Located near second processor 142 is communications transceiver 150, which is coupled to antenna 72. Communications transceiver 150 allows for the receiving and transmitting of data by telemetry.

Now referring to FIG. 8, there is shown a schematic, cutaway bottom view of chassis base 28. Located near the middle section of chassis base 28, as seen from below, is fuel tank 115. Fuel tank 115 may be a reservoir holding approximately 150 gallons of fuel. To each side of fuel tank 115 are tracks 30 and 32. Tracks 30 and 32 allow the aircraft maintenance robot 20 to have bilateral movement, as well as the ability to turn the maintenance robot 20 by individually actuating one of the tracking motors 152. Tracking motors 152 may include DC motors and gearboxes 154 and 156. The tracks 30 and 32 are much like the tracks on a bulldozer or tank.

Figure 9:
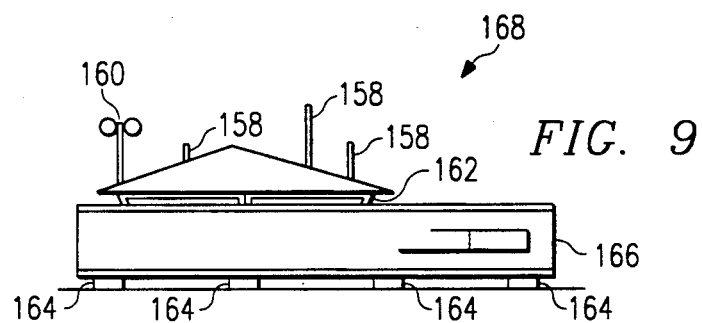
FIG. 9 is a schematic side view of the operations center in the travel mode.

Referring now to FIG. 9, there is shown an operations center 156, from which the aircraft maintenance robot 20 is monitored and initiated. FIG. 9 shows the operation center 156 in the travel mode. On the roof of operations cabin 168, located on operations center base 166, are antenna 158 and weather transducer 160. Antenna 158 allows communication with the aircraft maintenance robot 20, with pilots of commercial aircraft 22, and with the airport facility. Weather transducer 160, along with others not shown, allow weather information to be checked by the operator. Maintenance operations by the aircraft maintenance robot 20 may be viewed by the operator through side glass 162.

Figure 10:
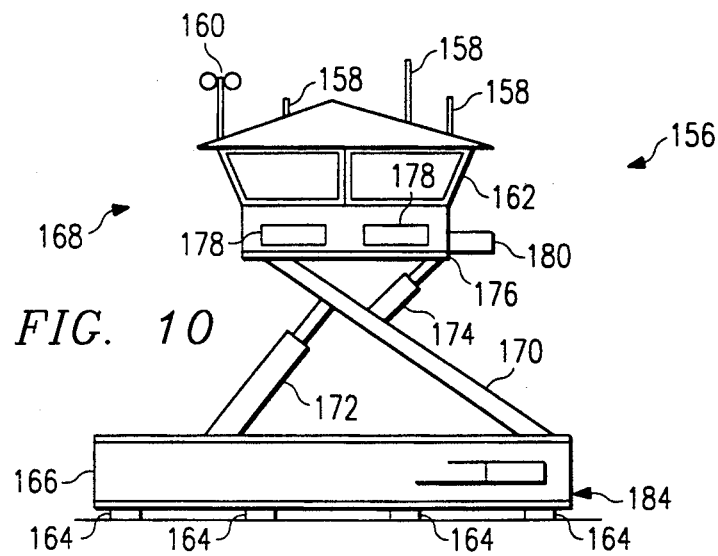
FIG. 10 is a schematic side view of the operations center in the operations mode.

Now referring to FIG. 10, there is shown a side view of the operations center 156 in the operations mode. The operations center 156 is supported by and may be transported by tracks 164. Operations center base 166 rests on tracks 164. Rotatably coupled to operations center base 166 are hydraulic strut 172 and beam 170. Beam 170 is also rotatably coupled to operations cabin base 176. Hydraulic strut 174 is rotatably coupled to operations cabin base 176 and to beam 170. The support structure of the operations cabin comprised of hydraulic struts 172 and 174 and beam 170 is operable to raise and lower the operations cabin by actuating hydraulic struts 172 and 174. Located on the side of operations cabin 168 are air intakes 178, which provide air to a turbine generator 182 (not shown). Turbine generator 182 is capable of providing all necessary energy for operations cabin 168. External power may also be used and may be imported through external power connection 184. Also located on the side of operations cabin 168 is heating, ventilation, and air conditioning unit 180.

The ability to raise and lower the operations cabin 168 with hydraulic struts 174, 172 and beam 170 allows a travel mode and an operations mode, which make operation of the maintenance robot system more convenient and safer. The operations cabin 168 can be placed in the travel mode, which provides a low center of gravity for more stability in moving. Additionally, the travel mode may be selected when the robotic system is not in use or when an emergency exists for an incoming aircraft such that the number of vertical hazards on the airfield is reduced.

Figure 11:
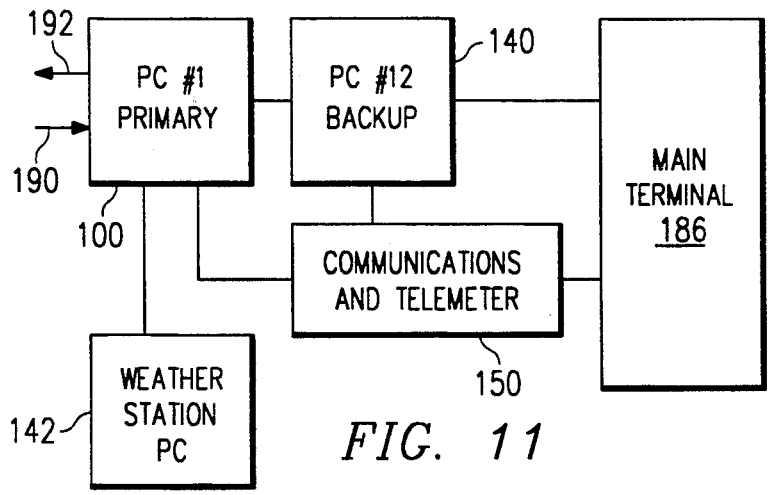
FIG. 11 is a block diagram of the processing and communications for the aircraft maintenance robot.

Now referring to FIG. 11, there is shown a schematic block diagram of the processing and communications for the maintenance robot 20. The second processor, or weather processor, 142 produces weather information in response to signals received from weather transducers 148, and the weather information is communicated to the first processor 100. Information from position transducer 188 (not shown) is transmitted to the first processor 100; the transmission of the signal from position transducer 188 into first processor 100 is represented by numeral 190. The signal to begin deicing and the dimensional code are received by the communications transceiver 150 from the operations center 156 and transmitted to the first processor 100. Signal 190, the weather information from second processor 142, the dimensional code, and the signal to perform deicing are also received by the backup first processor 140. Additionally, all the information being received by processor 100 is displayed on the main terminal 186 in the operations center 156. In the event of a failure of processor 100, backup first processor 140 is able to take over control of the maintenance operations. In normal operations, after having received the position transducer signal 190, the weather information from second processor 142, the dimension code, and start signal from the communications transceiver 150, the first processor 100, or backup first processor if the first processor 100 fails, develops control signals 192 to be carried to the various actuators by control signal lines 94.

Figure 12:
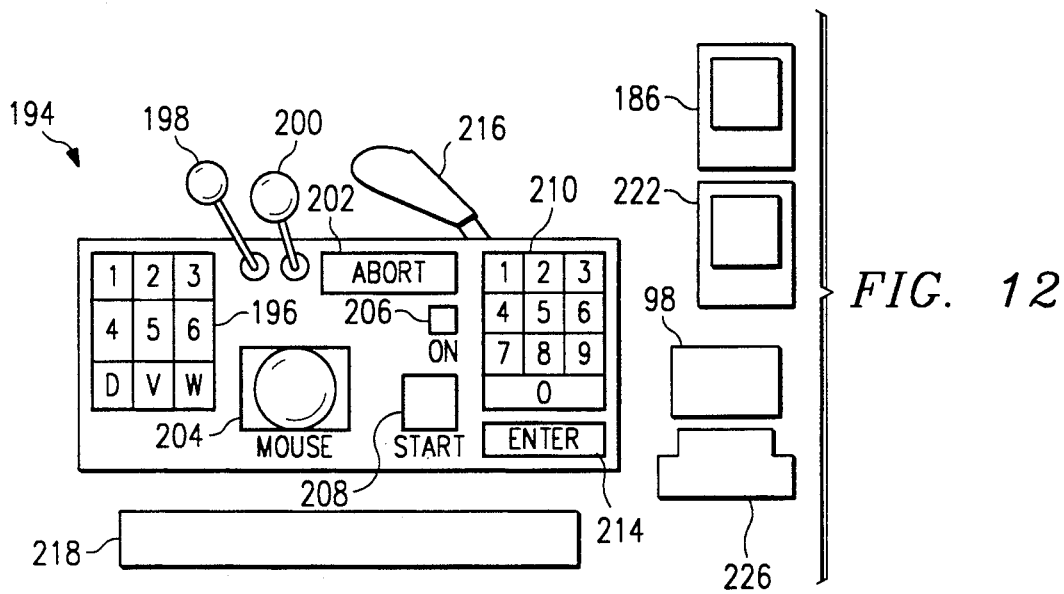
FIG. 12 is a schematic front view of the control panel for the aircraft maintenance robot and other equipment located in the operations cabin.

Referring now to FIG. 12, there is shown a front view of control panel 194 and equipment accessible by the operator in the operations cabin 168. To one end of control panel 194 appears a first keyboard 196 for manually entering weather information. Located on the control panel 194 near the first keyboard 196 are manual controls 198 and 200, which allow for a manual override of the control signals 192 generated by the first processor 100 or the backup first processor 140. Located on the control panel 194 near the manual controls 198 and 200 appears an abort switch 202. The abort switch 202 provides for an immediate halt of all operations and may be programmed to signal the aircraft maintenance robot 20 and the operations center 156 to move to some specified safety area. A ball track, or "mouse," 204 also appears on the control panel 194 and allows for movement of a cursor on the main terminal 186. Control panel 194 also contains an ON button 206 and a START button 208. The ON button 206 powers up the unit, and the START button signals first processor 100 to start a deicing cycle. Near START button 208 is a second keyboard 210 for entering a dimension code. Below the second keyboard 210 appears an ENTER button 214 for entering data on the computer. Associated with the control panel 194 is microphone 216 for use with the communications transceiver 150 or when talking to pilots or ground crew. Also associated with control panel 194 and other equipment in the operations cabin 168 is power seat 218. From power seat 218, the operator may operate control panel 194, main terminal 186, and other equipment of the to address ergonomic accommodations for operator comfort.

Additional equipment found in the operations cabin 168 and shown in FIG. 12 include main terminal 186, supplemental terminal 222, VCR 98 and printer 226. Main terminal 186 displays information entered and transmitted to the aircraft maintenance robot 20. Supplemental terminal 222 may be used to display additional information from the first processor 100 or the second processor 142, such as weather information. Supplemental terminal 222 may also take video from camera 76 in place of monitor 96 (not shown). VCR 98 is coupled to camera 76 to record application of deicing fluid 46 to the surfaces of commercial aircraft 22. Printer 226 is associated with control panel 194 and first processor 100, and provides a means for producing a hard copy record of the existing weather conditions and the completion of a specified aircraft identified by tail number.

Figure 13:
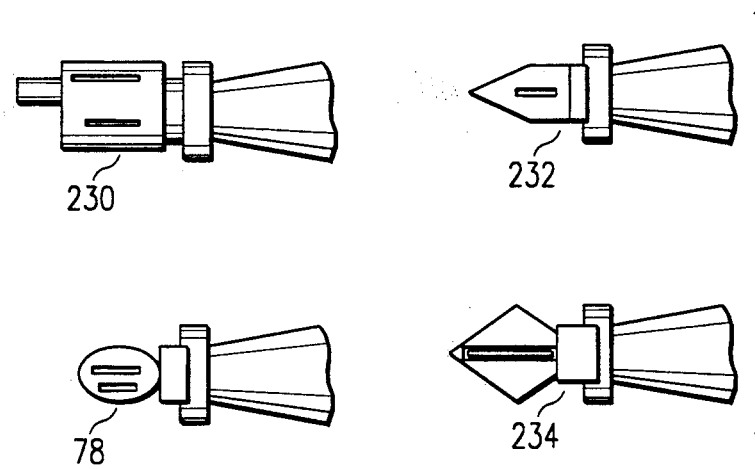
FIG. 13 is a side view of a multiplicity of exemplary maintenance tools.

Now referring to FIG. 13, there are shown examples of maintenance tools 228, which can be attached to manifold 44 so that the aircraft maintenance robot 20 may accomplish different maintenance tasks. The lower left corner of FIG. 13 shows nozzle 78 for deicing aircraft. In the upper left hand corner of FIG. 13, there is shown a video inspection probe 230. This probe 230 may be installed in manifold 44 for performing video inspections of aircraft surfaces. Video inspection probe 230 may also be a probe which allows inspection of aircraft surfaces with the use of X-ray. The upper righthand corner of FIG. 13 shows depaint nozzle 232 for the application of substances to remove paint from the surfaces of aircraft. The bottom righthand corner of FIG. 13 shows a washing nozzle 234 for cleaning commercial aircraft 22. Other maintenance tools 228 may be attached to manifold 44 to carry out other tasks; for example, a maintenance tool 238 could be attached to manifold 44 for firefighting.

Figure 14:
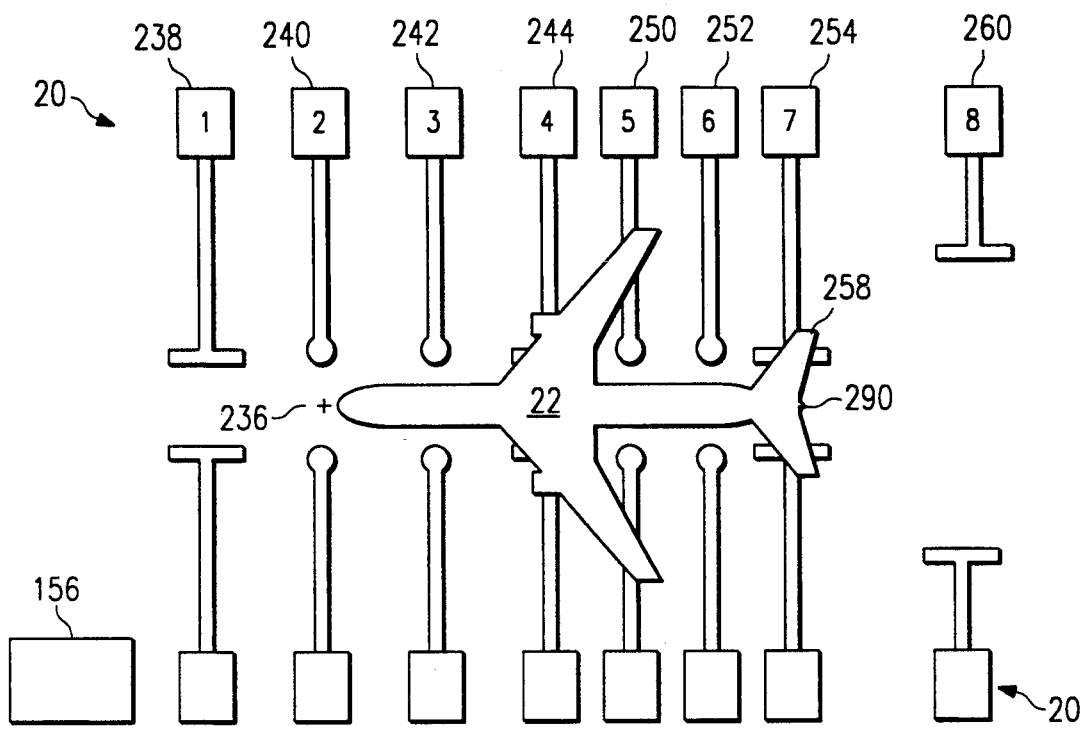
FIG. 14 is a schematic top view diagram of the deicing of a commercial aircraft over an elapsed time period for one deicing cycle.

Referring now to FIG. 14, there is shown an elapsed time, schematic top view of the deicing of a commercial aircraft 22 by two aircraft maintenance robots 20. The commercial aircraft 222 taxies up and is positioned in the reference position 236. The operator in the operations center 156 enters the tail number or a dimensional code on the control panel 194 with second keyboard 210. The information is transmitted to the aircraft maintenance robots 20, and their first processors 100 retrieve the proper envelope for that specific aircraft; the envelope is an imaginary covering for the commercial aircraft 222 of a given thickness such that, if the robotic arm traces out the envelope, it will remain within a given distance of the aircraft surfaces. The first processor 100 also receives weather information from the weather transducers 148. Second processor 142 possesses all of the functional capability of final processor 100 and serves as a ready back-up if first processor 100 should fail. Additionally, the first processors 100 receive information from positioning transducers 188. The basic steps of the deicing then begin.

The first processor, having received the go-ahead from the operator in the operations center 156, the weather information and the positioning information, then generates control signals 192 such that the arm 34 is raised on the mast 26 to a height above the top of the wing surfaces, beginning at position one 238. The first processor generates control signals 192 so that the tracking motors 152 are operated long enough to move the maintenance robots 20 to position two 240. Considering now the aircraft maintenance robot 20 on one side of the aircraft 22, the first processor 100 generates control signals 192 which position the manifold 44 with the arm 34 within a specified distance of the surface of the aircraft 22. The first processor 100 generates control signals 192 such that the manifold 44 with nozzles 78 delivers deicing fluid 46 to the aircraft nose at position two 240 and then moves the maintenance robot 20 toward the empennage, or tail of the aircraft 290. The application of deicing fluid to aircraft is a continuous smooth process in which deicing robot 20 smoothly graces the aircraft 22 surface. Although the following discussion details various positions, the positions are for reference or orientation only and do not reflect starts or stops in robot 20 motion along the aircraft 22 fuselage.

At position three 242, the first processor 100 develops control signals 192 so that deicing fluid 46 is similarly delivered to the surfaces of the aircraft for that section. After deicing the next section, the maintenance again moves robot 20 toward empennage 290. Upon reaching the wings, shown in FIG. 14 as position four 244, the processor 100 generates signals such that the manifold 44 is positioned to deliver deicing fluid 46 to the fuselage 246, and then the manifold is rotated such that nozzles 78 are parallel to the surface of the wing, and the arm is moved away from the fuselage 246 until reaching the wingtip 248. After reaching the wingtip, the maintenance robot 20 is moved one manifold width toward the empennage 290. The arm is then moved towards the fuselage 246 until it gets within a specified distance of the fuselage 246. The arm then stops moving and is rotated such that the plane formed by the nozzles 78 is parallel to a line tangent to a cross section of the fuselage 246 and perpendicular to fuselage 246. The manifold 44 is then positioned by the arm 34 and wrist 74 such that it traces the fuselage 246, delivering deicing fluid 46 to the surfaces thereof.

After delivering deicing fluid 46 to the surfaces of that section, the first processor 100 sends the necessary control signals 192 to the tracking motors 152 to move one manifold width towards the empennage, stopping at position five 250. Similar steps for deicing the fuselage occur at position five 250 and position six 252. Upon reaching the rudder and stabilizer, shown at position seven 254, the first processor 100 positions the manifold with the arm to deliver deicing fluid 46 to the rudder 256, but not raising the manifold above the height of the lowest point on the stabilizer 258.

The commercial aircraft 22 shown in FIG. 14 has a "T" tail, which means that the stabilizer is attached to the rudder at the top so that the rudder is the vertical of a "T", and the stabilizer is the horizontal of the "T". After delivering deicing fluid to the rudder 256, the first processor 100 produces control signals 192 to move manifold and arm away from the rudder adequately to clear the outer edge of the stabilizer 258. Then the manifold is raised and positioned to deliver deicing fluid 46 to the top surface of the stabilizer 258.

After delivering the deicing fluid 46 to the stabilizer 258, the first processor 100 produces the control signals 192 such that the tracking motors 152 move the maintenance robot 20 to the ready position in the rear, position eight 260. Upon reaching eight 260, the operator is signalled that deicing is complete and indicator lights 62 and 60 are turned on. Additionally, after completion of deicing, robot 20 may return to a docking station for refueling or storage.

Figure 15:
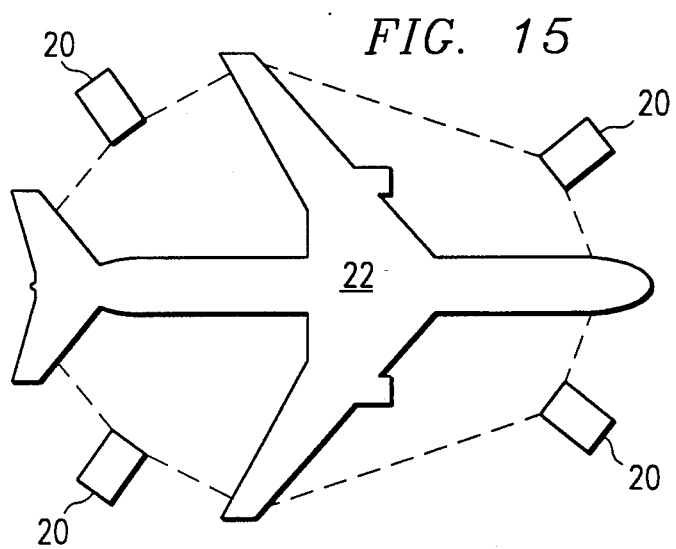
FIG. 15 is a schematic top view showing the configuration of aircraft maintenance robots when four robots are used.

Now referring to FIG. 15, there is shown a schematic, top view of a commercial aircraft 22 with placement of four aircraft maintenance robots 20. The configuration of FIG. 15 would work similarly to the process explained in conjunction with FIG. 15, except each of the aircraft maintenance robots 20 would be responsible for only one-fourth of the surfaces of the commercial aircraft 22.

Figure 16:
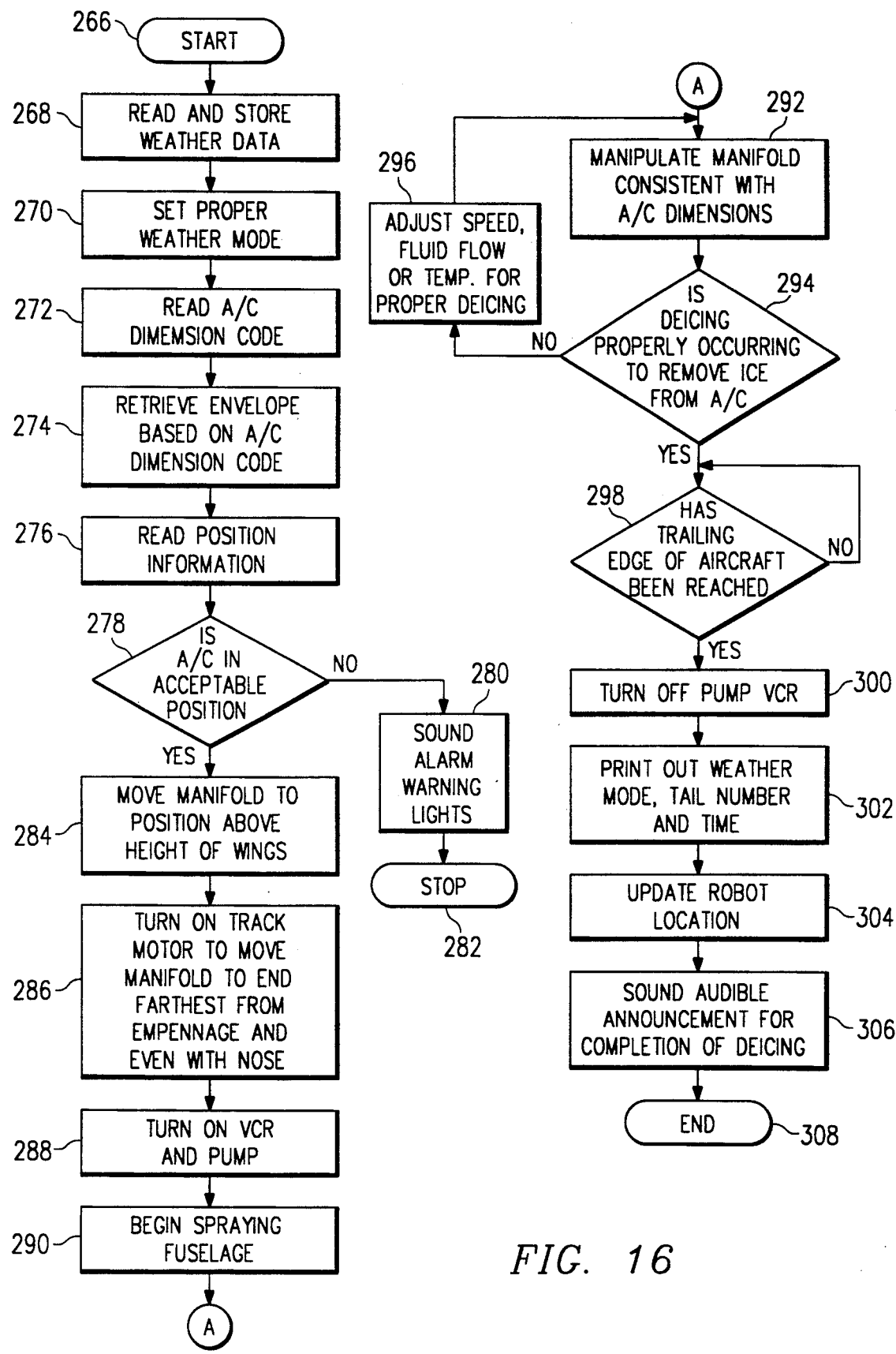
FIG. 16 presents a flowchart of an exemplary process for deicing a commercial aircraft with the aircraft maintenance robot.

A better understanding of an exemplary deicing cycle is represented in the flowchart in FIG. 16. The commercial aircraft 22 may be considered to have taxied into reference position 236. Operator in the operations cabin 168 then starts the process. Starting point 266 of the FIG. 16 flowchart represents this step. The first processor 100 then reads and stores the weather information in step 268. The first processor 100 then sets the proper weather mode for the particular deicing cycle at step 270. Then, the processor reads the dimension code at step 272, and based on the dimension code, retrieves the proper envelope at step 274. Then, processor 100 reads the position information for aircraft 22 at step 276. The next step is for processor 100 to determine whether aircraft 22 is in an acceptable position with regard to reference position 236, step 278. If not, processor 100 sounds an alarm and turns on a warning signal light at step 280 and then stops the deicing cycle at step 282.

If processor 100 decides that aircraft 22 is in an acceptable position with regard to reference position 236, processor 100 generates control signals 192 to raise the manifold and arm 34 above the height of aircraft 22 wings at step 284. The next step, at 286, is to turn on the track motor to move the manifold to the end farthest from empennage and even with the nose of aircraft 22.

With robot 20 in position, the process entails turning on the VCR and pump at step 288 and to begin spraying the fuselage at step 290. In a continuous flowing motion robot 20 manipulates the manifold consistent with the aircraft dimensions as determined by the aircraft dimension code. This is step 292 of FIG. 16 during which robot 20 causes the manifold to move about the aircraft 22 fuselage in a continuous flowing motion from the nose to the empennage. During this process, processor 100 queries whether deicing is occurring properly to remove ice from the aircraft 22 at step 294. This may be done by any of the methods or devices described above. If deicing is not properly occurring, processor 100 at step 296 adjusts the speed of robot 20, or the fluid flow or temperature to achieve proper deicing at 296. Otherwise, processor 100 continues to query whether the trailing edge of aircraft 22 has been reached at step 298. When this occurs, the pump and VCR are turned off at step 300. Processor 100 then prints out the weather mode, tail number and time or other pertinent information at step 302 and updates robot 20 location at 304. An audible announcement for completion of deicing occurs at step 306 at this point. Finally, processor 100 ends the deicing process at step 308.

It is to be understood that the preceding process was for one maintenance robot 20 in a preferred embodiment which involves two maintenance robots. The process for maintenance robot 20 on the other side would be similar to the process presented. Additionally, the preferred embodiment includes the ability to perform the preceding process in reverse, beginning with the maintenance robot 20 in the rear position and moving toward the nose of aircraft 22.

Although the present invention and its advantages have been described in detail, it should be understand that various changes, substitutions, and alterations may be made herein without departing from the spirit and scope of the invention as defined in the appended claims.

What is claimed is:

1. A robotic aircraft deicer for distributing deicing fluid to surfaces of an aircraft, comprising:
   nozzles for spraying the deicing fluid on the surfaces of the aircraft;
   delivering means for delivering the deicing fluid to said nozzles;
   positioning means for positioning said nozzles to deliver the deicing fluid to the surfaces of the aircraft; and
   control means coupled to said positioning means and operable to automatically control said positioning means such that the deicing fluid may be delivered to the surfaces of the aircraft without substantial intervention of a human operator, said control means comprising:
   a first processor;
   means for entering physical dimensions of the aircraft into said first processor, said first processor operable to generate a plurality of control signals in response to entry of said dimensions into said first processor;
   means for entering weather information into said first processor, said first processor operable to adjust said control signals to account for said weather information; and means for transmitting said control signals from said first processor to said positioning means.

2. The deicer of claim 1, wherein said delivering means for delivering said deicing fluid comprises:
a reservoir operable to store deicing fluid;
a heater fluidly connected to said reservoir and operable to heat portions of said deicing fluid; and
a pump fluidly connected to said reservoir, said heater and said nozzles and operable to pump said portions of the deicing fluid from said reservoir to said heater and from said heater to said nozzles.

3. The deicer of claim 1, wherein said positioning means comprises:
a plurality of arms linked at the ends, said plurality of arms having a first and second free end;
manifolds associated with said first free end of said arms and said nozzles coupled to said manifolds;
said arms responsive to control signals from said control means;
a wrist coupled to said first free end of said arms and coupled to said manifolds and operable to allow pivotal motion of said manifold and responsive to control signals;
said manifolds operable to allow telescoping of said manifolds; and
a base containing a guide and coupled to said second free end of said plurality of arms such that said second free end of said plurality of arms is movable in said guide.

4. The deicer of claim 3, and further comprising:
a reference position;
means for accounting for the position of the aircraft about at least two axes in an area for deicing with respect to said reference position; and
means for adjusting said control signals from said first processor to account for variations from said position of the aircraft with respect to said reference position.

5. The deicer of claim 4, wherein said means of positioning said aircraft in said reference position comprises:
transducers operable to sense location of an aircraft within said deicing area and to produce signals corresponding thereto; and
signals from said transducers transmitted to said first processor.

6. The deicer of claim 3, and further comprising means for recording delivery of said deicing fluid.

7. The deicer of claim 6, wherein the said means for recording delivery of said deicing fluid comprises:
a video camera coupled to said first free end of said arms;
a monitor coupled to said video camera, said monitor and said video camera operable to view surfaces of the aircraft and the application of deicing fluid to said surfaces;
a video recorder coupled to said video camera; and
a printer coupled to said first processor.

8. The deicer of claim 3, wherein the said control means further comprises:
means for overriding said control signals from said first processor; and
means for manually generating said control signals.

9. The deicer of claim 3, wherein said means for entering weather information comprises:
weather transducers;
a third processor electrically coupled to said weather transducers and operable in conjunction with said weather transducers to generate weather information;
means for overriding said weather transducer signals;
means for accepting weather information from airport weather facility;
means for selecting weather information from said third processor or from the airport facility; and
means for transmitting said selected weather information to said first processor.

10. The deicer of claim 3, and further comprising means for transporting said deicing unit.

11. The deicer of claim 3, and further comprising the means for producing all necessary power for the deicer.

12. The deicer of claim 1, and further comprising means for recovering and reconditioning a portion of the deicing fluid sprayed on the surfaces of the aircraft.

13. The deicer of claim 12, wherein said means of recovering the deicing fluid comprises:
a collector located outwardly adjacent to aircraft and operable to collect a portion of the deicing fluid;
reservoirs;
filtering means for filtering the deicing fluid operable to filter unwanted solid particles in the recovered deicing fluid;
a chemical separator operable to separate the deicing fluid from other liquid substances therein and distribute the separated deicing fluid and recovered substances other than deicing fluid to said reservoirs;
new deicing fluid in said reservoirs;
a mixing chamber wherein the recovered deicing fluid and new deicing fluid from said reservoirs are mixed;
a pump;
a conduit fluidly connected to said collector, said filtering means, said separator, mixing chamber, said pump, and said reservoirs;
a second processor;
a multiplicity of valves coupled to conduit and responsive to said control signals operable to control flow of fluids in the various branches of said conduit;
said second processor operable to produce said control signals to said valves and said pump such that recovery and reconditioning occur substantially without human intervention.

* * * * *

UNITED STATES PATENT AND TRADEMARK OFFICE
CERTIFICATE OF CORRECTION

PATENT NO. : 5,318,254
DATED : June 7, 1994
INVENTOR(S) : E. Craig Shaw, et al

It is certified that error appears in the above-indentified patent and that said Letters Patent is hereby corrected as shown below:

Column 7, line 39, after "and other equipment of the ", insert --operations cabin 168. Power seat 218 is fully adjustable-- therefor.

Column 8, line 57, after "the next section, the maintenance", delete "again moves robot 20" and insert --robot 20 again moves-- therefor.

Signed and Sealed this

Twenty-ninth Day of November, 1994

Attest:

BRUCE LEHMAN

*Attesting Officer*    *Commissioner of Patents and Trademarks*